United States Patent [19]

Ishii et al.

[11] 3,955,771

[45] May 11, 1976

[54] FILM MAGAZINE FOR CAMERAS

[75] Inventors: Chiseki Ishii; Fumio Kobayashi, both of Omiya, Japan

[73] Assignee: Fuji Photo Optical Co., Ltd., Omiya, Japan

[22] Filed: Feb. 5, 1975

[21] Appl. No.: 547,163

[30] Foreign Application Priority Data

Feb. 5, 1974   Japan................................ 49-14119

[52] U.S. Cl. ............................................ 242/71.2
[51] Int. Cl.² ........................................... G03B 1/04
[58] Field of Search.................. 242/71.2, 71.1, 195, 242/197

[56] References Cited
UNITED STATES PATENTS

| | | | |
|---|---|---|---|
| 3,422,740 | 1/1969 | Nerwin | 242/71.1 X |
| 3,664,595 | 5/1972 | Nerwin | 242/71.1 X |
| 3,695,160 | 10/1972 | Stockdale | 242/71.1 X |
| 3,811,634 | 5/1974 | Edwards | 242/71.2 X |

*Primary Examiner*—Edward J. McCarthy

[57] ABSTRACT

A film magazine for still cameras of the type comprising a film feed-out chamber, a film take-up chamber and an intermediate portion extending between the two chambers and having a rectangular exposure aperture is provided at the opposite sides of the aperture thereof with guide grooves for allowing the film in the magazine to be pulled out therethrough. The guide grooves are slanted in such a direction as to facilitate the pull-out of the film. In a preferred embodiment of the invention, the slanted guide groove is provided with an engaging projection to be engaged with a perforation of the film so that the perforation of the film may fall into engagement therewith when the trailing end of the film comes to the guide groove.

3 Claims, 4 Drawing Figures

FILM MAGAZINE FOR CAMERAS

BACKGROUND OF THE INVENTION

1. Field of the Invention

This invention relates to a film magazine for cameras, and more particularly to a film magazine for still cameras of the type comprising a film feed-out chamber, a film take-up chamber and an intermediate portion connected between the two chambers and having an exposure aperture.

2. Description of the Prior Art

In still cameras, it has been known to use a film magazine comprising a film feed-out chamber, a film take-up chamber and an intermediate portion bridging the two chambers and having a rectangular exposure apertue. As examples of this type of film magazines, "INSTAMATIC" magazines and "FUJIPACK" magazines are commercially available. In this type of film magazine, the film loaded in the feed-out chamber is taken up into the take-up chamber by way of the intermediate portion. When the film is stopped at the exposure aperture and the shutter is opened, the film is exposed to imagewise light coming through the taking lens of the camera. After all frames are exposed, the film is rolled up in the take-up chamber and the film magazine is taken out of the camera.

In the development process of the film loaded in the above type of film magazines, the film magazine is first broken to take the film out. Therefore, film developing laboratories are required to have apparatus for taking the film out of the film magazines by destroying the magazine body.

Under the above described circumstances, the time required in the development process is increased and the film is apt to be damaged by the shock occurring upon destruction of the magazine body. Further, the time required for collection and disposal of the pieces of the film magazine scattered in the destruction thereof prolongs the time for processing the film. In addition, in order to prevent the film from being damaged by the destruction of the magazine body, the size of the film magazine is best made desired somewhat larger than would otherwise be necessary. Therefore, the conventional film magazines of this type are economically disadvantageous.

A will be understood from the above observations and description, various technical problems and economical disadvantages in the conventional development system of the film loaded in the above described type of film magazine result from the particular structure of the film magazine which must be destroyed to take the film out.

It is therefore desirable to provide a film magazine from which the film loaded therein can be taken out without destroying the magazine body.

SUMMARY OF THE INVENTION

In view of the above-described circumstances, it is the primary object of the present invention to provide a film magazine for still camera which comprises a film feed-out chamber, a film take-up chamber and an intermediate portion characterized in that the film loaded therein can be taken out without destroying the magazine body.

Another object of the present invention is to provide a film magazine which is economically advantageous in the sense that the film processing system does not need apparatus for destroying the magazine body, and the size of the film magazine need not be enlarged.

Still another object of the present invention is to provide a film magazine from which the film loaded therein can be easily taken out without destroying the magazine body.

A still further object of the present invention is to provide a film magazine in which the film is prevented from being fully rolled up in the film take-up chamber so that the trailing end of the film may be stopped in the exposure aperture and easily pulled out of the intermediate portion of the film magazine.

The film magazine in accordance with the present invention comprises a film feed-out chamber, a film take-up chamber and an intermediate portion extending therebetween provided with a rectangular exposure aperture, said intermediate portion being communicated with the two chambers so that the film may be fed from the feed-out chamber to the take-up chamber through the intermediate portion, the width of said rectangular exposure aperture of the intermediate portion being smaller than the width of the film fed therethrough. The film magazine in accordance with the present invention is characterized in that the rectangular exposure aperture is provided with a pair of cut-away guide grooves on the opposite sides thereof so that the film may be pulled out through the guide grooves from the exposure aperture.

The guide grooves are slanted in one direction so that the trailing end of the film the leading part of which is rolled in the take-up chamber may easily be pulled obliquely backward through the slanted guide grooves.

In the preferred embodiment of the invention, the guide grooves on the sides of the rectangular exposure aperture are provided with engaging projections to be engaged with the perforations of the film so that the perforations of the film in the trailing end portion thereof may fall into engagement with the projections when the trailing end of the film comes to the exposure aperture and the film may be prevented from being fully rolled up in the film take-up chamber.

PREFERRED EMBODIMENTS OF THE INVENTION

Figure 1:
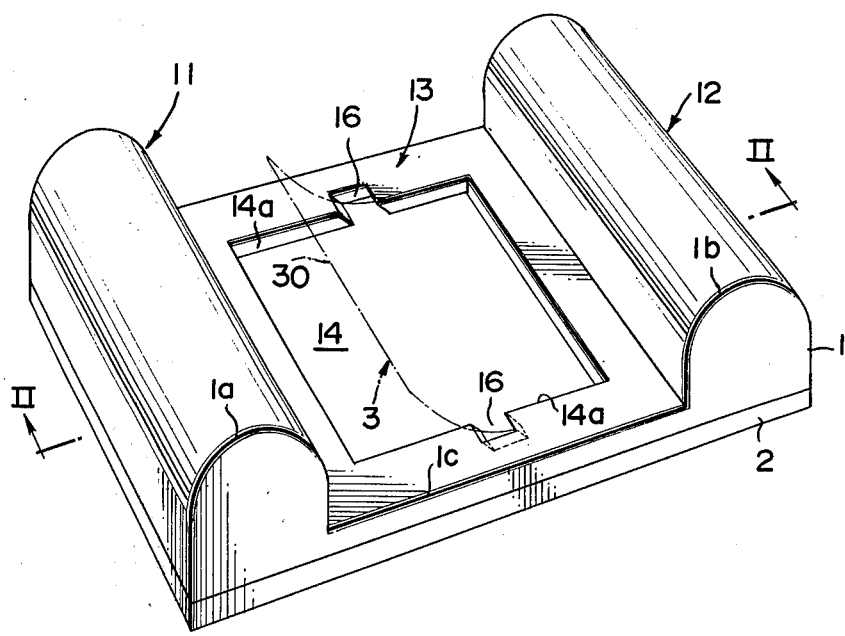
FIG. 1 is a perspective view showing an embodiment of the film magazine in accordance with the present invention.
Figure 2:
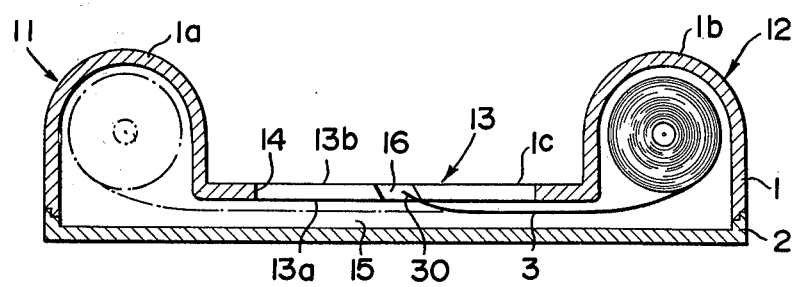
FIG. 2 is a longitudinal sectional view of the film magazine as shown in FIG. 1.

A first embodiment of the invention is shown in FIGS. 1 and 2. The film magazine comprises a film feed-out chamber 11, a film take-up chamber 12 and an intermediate portion 13 extending between the two chambers 11 and 12 and provided with a rectangular exposure aperture 14. The film magazine is composed of a body portion 1 and a cover portion 2. The body portion 1 has a feed-out chamber portion 1a, a take-up chamber portion 1b and an intermediate bridging portion 1c provided with the rectangular exposure aperture 14. The cover portion 2 is a flat member which is combined with the body portion 1 to form said chambers 11 and 12 at the opposite ends thereof and a film passage 15 in the intermediate portion 13. The film passage 15 is communicated with said two chambers 11 and 12 at the opposite ends thereof as shown in FIG. 2 so that the film 3 fed out of the film feed-out chamber 11 may be taken up in the film take-up chamber 12 by way of the film passage 15 formed in the intermediate portion 13.

The rectangular exposure aperture 14 is provided with a pair of guide grooves 16 at the opposite sides 14a thereof. The guide grooves 16 extend from the internal surface 13a of the intermediate bridging portion 1c of the body portion 1 to the external surface 13b thereof. The width of the exposure aperture 14 is smaller than the width of the film loaded in the film magazine so that the opposite sides 14a of the aperture 14 may guide the film 3 between the two chambers 11 and 12. Said guide grooves 16 enlarge the width of the aperture 14 up to the width of the film 3 so that the film 3 may be guided out therethrough from the film passage 15.

When all frames of the film 3 are exposed and the trailing end portion 30 of the film comes to the exposure aperture 14, the film 3 is stopped there and the trailing end portion 30 of the film is pulled out of the film passage 15 along the guide grooves 16 as shown in FIGS. 1 and 2. Since the exposure aperture 14 has a width large enough for the film 3 to be pulled out therethrough at the portion of the guide grooves 16, the film 3 can easily be pulled out of the film magazine without breaking or destroying the magazine body.

The guide grooves 16 are preferably slanted so that in inner part thereof is nearer to the film take-up chamber 12 than the outer part thereof as shown in FIGS. 1 and 2. By so forming the guide grooves 16, the film 3 can be even more easily pulled out of the film magazine without being damaged.

Figure 3:
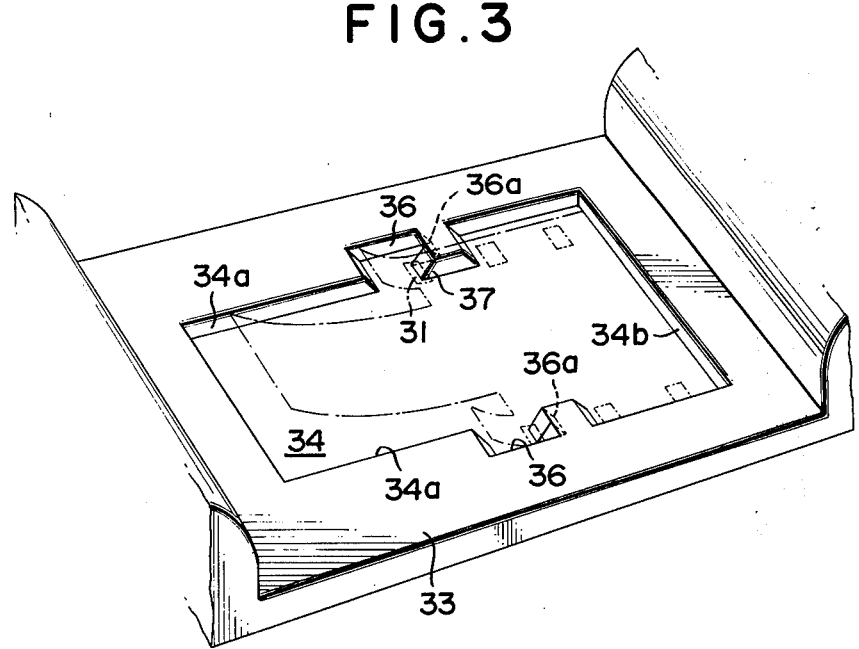
FIG. 3 is a fragmentary enlarged perspective view showing the exposure aperture of the film magazine in accordance with another embodiment of the present invention.
Figure 4:
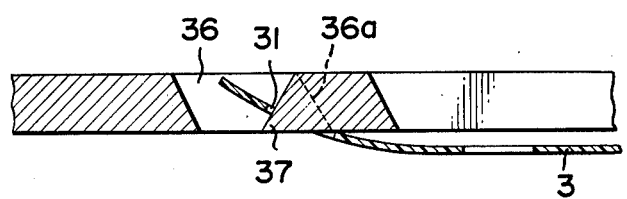
FIG. 4 is a fragmentary enlarged view of a part of the exposure aperture as shown in FIG. 3.

A second preferred embodiment of the invention is shown in FIGS. 3 and 4 wherein only the exposure aperture is illustrated. In the embodiment shown in FIGS. 3 and 4, each of the guide grooves 36 formed at the opposite sides 34a of the exposure aperture 34 is provided on one guide face 36a thereof on the take-up chamber side with an engaging projection 37. The engaging projection 37 is positioned to be engaged with the perforation 31 of the film 3 in the trailing end portion 30 thereof when the film 3 comes to the guide grooves 36.

Since the film 3 has tendency to curl in the direction in which the film has been rolled, the trailing end portion 30 of the film 3 has the tendency to curl upward as shown in FIGS. 3 and 4. Therefore, the perforations 31 of the film 3 at the end of the film 3 will naturally fall into engagement with the engaging projections 37 when the trailing end of the film 3 comes to the guide grooves 36. In this embodiment, therefore, the film 3 can easily be prevented from being rolled up in the take-up chamber 12. Accordingly, the process for taking the film out of the film magazine is considerably facilitated.

In addition, in the second embodiment of the invention as shown in FIGS. 3 and 4, the width of the exposure aperture 34 is enlarged between the guide grooves 36 and the take-up chamber side end 34b thereof so that the film 3 can be pulled out through the widened part of the aperture 34. This widened part of the exposure aperture 34 is useful when the perforations 31 of the trailing end portion 30 of the film have slipped by the engaging projections 37.

It will be understood that the engaging projections 37 need not be provided on both guide grooves 36. In some cases, only one engaging projection 37 provided in only one guide groove 36 will be enough to stop the film 3.

We claim:

1. In a film magazine for still cameras comprising a film feed-out chamber, a film take-up chamber and an intermediate portion extending between said chambers and having a rectangular exposure aperture, said intermediate portion forming therein a film passage extending between said chambers and communicated with said chambers, the improvement comprising a pair of slanted guide grooves formed one on each side of said aperture, the inner part of said guide grooves being nearer to the film take-up chamber than the outer part thereof, the width of said exposure aperture being large enough to allow the film in said film passage to be pulled out from the passage through said guide grooves.

2. A film magazine for still cameras as defined in claim 1 wherein at least one of said guide grooves is provided on one face thereof on the film take-up chamber side with an engaging projection to be engaged with a perforation of the trailing end portion of the film.

3. A film magazine for still cameras as defined in claim 2 wherein said exposure aperture is enlarged in its width between the guide grooves and the film take-up chamber side end thereof, the enlarged width being larger than the width of the film loaded in the film magazine.

* * * * *